June 9, 1936.    N. RASKHODOFF    2,043,676
PROTECTIVE DIAL LIGHT
Filed Feb. 16, 1935
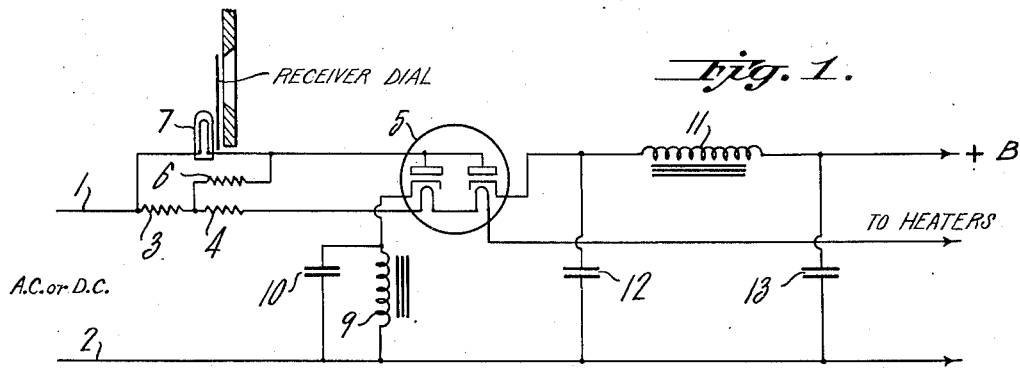
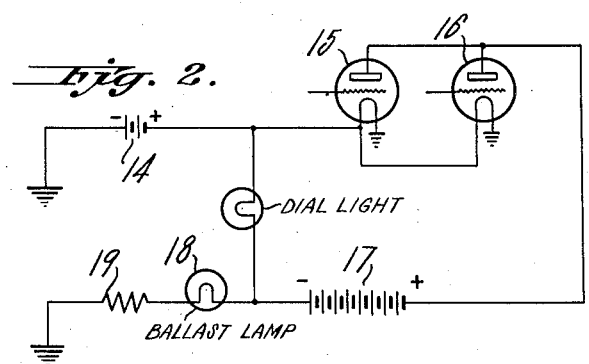
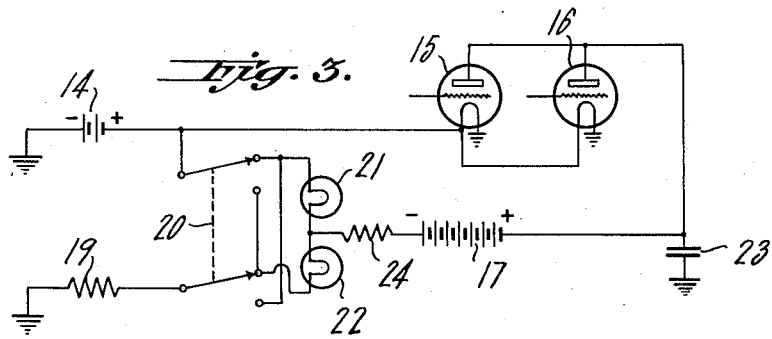
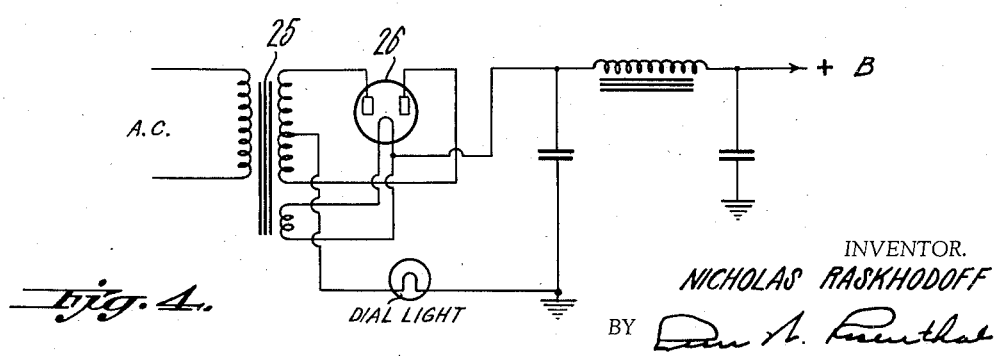
INVENTOR.
NICHOLAS RASKHODOFF
BY
ATTORNEY.

Patented June 9, 1936

2,043,676

UNITED STATES PATENT OFFICE 2,043,676

PROTECTIVE DIAL LIGHT

Nicholas Raskhodoff, Springfield, Mass., assignor to United American Bosch Corporation, Springfield, Mass., a corporation of New York Application February 16, 1935, Serial No. 6,811

6 Claims. (Cl. 250—27)

This invention relates to radio apparatus and more particularly to an overload prevention device which is incorporated in a high voltage circuit of the power supply equipment. A receiver dial light is connected in such a circuit and serves the dual function of dial illumination and a current limiting device for the power supply system. In case of a short circuit in the high voltage circuits of a radio receiver or power supply system, a severe current drain is imposed on the rectifier tube and associated power transformer or the B batteries, according to the type of receiver. In a circuit arranged in accordance with this invention such an occurrence would result merely in burning out the inexpensive and easily replaceable dial light, thus removing the overload from the costly power supply equipment. The dial light may be connected in such a manner as to receive current from both the plate circuit and the filament circuit of a receiver, and to act as a limiting device for the plate current flow.

An object of this invention is to provide a combination dial light and indicating device of high visibility.

Another object is to provide a combination dial light and power supply current limiting device.

A further object is to provide a current limiting device in a high voltage circuit of radio apparatus, which comprises a high visibility indicating device.

Other objects and advantages will in part be specifically stated and in part be obvious when the following specification is read in connection with the drawing, in which:

Fig. 1 is a diagram of the power supply system of an A. C.–D. C. receiver incorporating the present invention and showing an illuminated dial comprising a fragmentary portion of an associated receiver; Fig. 2 is a diagrammatic showing of a modification of the invention as applied to a battery type receiver; Fig. 3 is an alternative form of Fig. 2; and Fig. 4 shows the invention as applied to an alternating current receiver.

While Figs. 2, 3, and 4, for the purpose of simplifying the diagrams, do not show the incandescent lamp adjacent a receiver dial as in Fig. 1, they are to be understood as so positioned in the respective associated receivers.

Referring in more detail to Fig. 1, the numerals 1 and 2 indicate the leads from a commercial power main, either A. C. or D. C. Series resistors 3 and 4 are connected in lead 1 to provide a suitable voltage drop for the heater elements of the rectifier tube 5 and the tube heaters of an associated receiver. The rectifier tube 5 is the well known voltage doubler type generally employed in combination A. C.–D. C. receivers and forms no part of the present invention. A resistor 6 has one end connected between the resistors 3 and 4 and the other end connected to the anodes of the tube 5. An incandescent lamp 7 is connected between supply lead 1 and the anodes of tube 5, forming a shunt circuit around resistors 3 and 6. Lamp 7 is positioned adjacent the dial of the associated receiver, shown in fragmentary form, and serves as a dial light, indicator, and current limiting device, as will later be explained in detail. A filter choke 9, which may be the speaker field winding, is connected between one cathode of tube 5 and supply lead 2, and is shunted by a bypass condenser 10. The other cathode of tube 5 supplies +B voltage to the usual filter unit comprising a series choke 11 and filter condensers 12 and 13. The filtered B voltage is then led to the plate circuits of any suitable receiver.

In an A. C.–D. C. receiver employing this invention, the lamp 7 normally carries the plate current load drawn by the receiver, and has such selected constants that it will burn out when the plate current load becomes abnormal. In case of a short circuit in the B voltage system of a receiver, or a break-down of a filter condenser, a heavy drain is imposed on the rectifier tube and preceding units of the system, which frequently results in heating and the ultimate destruction of costly apparatus. Upon such an occurrence in this present invention, the lamp 7 would burn out, opening the shunt circuit and leaving the resistors 3 and 6 in series in the B voltage supply portion of the system thus limiting the current drain to a safe value. The operator has his attention called to the faulty operation of the receiver by the darkening of the dial lamp, even though the trouble may not seriously affect the performance of the receiver. As before stated, resistors 3 and 4 provide the necessary voltage drop for operation of the tube heaters of the receiver. In addition, resistor 3 provides a voltage drop across the lamp 7, which adds to the B current flowing through the lamp. The value of resistor 6 controls the additional current flow through the lamp, and proper selection of its resistance will prevent the illumination of the lamp when the supply line plug is inserted with improper polarity in a D. C. power line. By means of the particular connection of resistors 3 and 6, the lamp 7 more closely approaches illumination of the same degree regardless of the type of current supplied, depending jointly upon the B voltage circuit and the heater supply circuit for its operation.

Fig. 2 is a modification of the device as applied to a battery type receiver. A filament battery 14 has its negative side grounded and the positive side connected to the filaments of tubes 15 and 16. The negative leg of each filament is grounded to provide a current return circuit. The plates of tubes 15 and 16 are supplied by a plate battery 17 which has its negative side grounded through a series connected ballast lamp 18 and resistance 19. A dial light is connected between the positive terminal of the filament battery 14 and the negative terminal of the plate battery 17. The ballast lamp 18 may be an incandescent lamp of the same general type as the dial light and is included in the circuit to provide a non-linear resistance in additive relation to the low value fixed resistance 19. The dial light receives current from both the filament battery 14 and the return plate circuit current supplied by battery 17. The lessened current drain upon the filament battery is of considerable importance in the two volt type of battery, where a severe restriction is imposed upon current drain. As the voltage of the filament battery 14 falls, the current flow through the dial light would normally fall. The resistance of ballast lamp 18 decreases, however, with the drop in current flow, and tends to keep constant the current flow from battery 14 through the dial light. Thus dial illumination is obtained, through the non-linear resistance of the circuit, over a much greater range of filament battery voltage than is possible with a circuit having a suitable fixed resistance. In case of a short circuit in the plate circuits, both the dial light and the ballast lamp 18 burn out due to overload from excessive current flow from plate battery 17, and thus open the circuit. As is well known, the plate current of a receiver having an automatic volume control varies with the control, and when this invention is placed in such a receiver, the dial light varies in brilliance according to the change in plate current. Thus the invention may be employed as a tuning indicator, the lowest point of brilliance indicating resonance.

The circuit shown in Fig. 3 is a modification of Fig. 2 and like parts bear the same reference characters. In multi-waveband receivers it is common to provide separate dial lights of various color to indicate which band is in use. For such use a ganged two point switch 20 is provided which allows either of lamps 21 or 22 to be employed as a dial light, and the other serves as a ballast lamp. With the switch in the position shown in Fig. 1, the lamp 21 is full brilliance and serves as the dial light. When the switch is thrown to the alternate position, the lamp 22 becomes the dial light and lamp 21 the ballast. An electrolytic condenser 23 may be connected between the positive side of plate battery 17 and ground. In order to protect the lamps against a momentary surge of condenser charging current, a limiting resistance 24 is connected to the negative side of the battery 17.

Fig. 4 shows the invention as applied to the power supply system of an alternating current receiver. A power transformer 25 has each end of a center tapped secondary winding connected to an anode of a full wave rectifier tube 26. A return circuit lead including a dial light is connected between ground and the center tap of the secondary winding. Thus the dial light carries the full plate current of the system and of any associated receiver. In case of a short circuit to ground anywhere in the entire plate circuit system, the rectifier tube 26 will pass an excessive current and the dial light will burn out as a result thereof and open the circuit.

It will be apparent that many modifications and changes may be made by anyone skilled in the art. For example, the dial light may be connected in series with a rectifier tube anode, or any of the filter elements of either a full wave or half wave rectifier system without departing from the spirit and scope of the invention as expressed in the following claims.

I claim:

1. In radio apparatus having a power supply system, a circuit in said system including as an overload prevention device an incandescent lamp of predetermined current carrying capacity, said lamp comprising a dial light for said radio apparatus and a current limiting device for said power supply system.

2. In radio apparatus having a tuning dial and a power supply system, a source of illumination positioned adjacent said tuning dial, said source of illumination being included in a circuit of said power supply system and comprising a current limiting device for said system.

3. In radio apparatus, a rectifier tube having an anode circuit and a cathode heating circuit, a series connected resistance in said cathode heating circuit, a parallel circuit around said resistance including an incandescent lamp, and a connection between said parallel circuit and said anode circuit.

4. In radio apparatus, a rectifier tube having an anode circuit and a cathode heating circuit, a series connected resistance in said cathode heating circuit, a parallel circuit around said resistance and comprising a series connected incandescent lamp and a second resistance, and a connection from said anode circuit to a point between said lamp and said second resistance.

5. In radio apparatus having a plate and a filament circuit, a power source for said filament circuit and a power source for said plate circuit, a circuit including an incandescent lamp and a non-linear resistance connected across said filament power source, and a connection from a point between said lamp and said resistance to said plate circuit power source.

6. In radio apparatus having a plate and a filament circuit, a power source for each of said circuits, an incandescent lamp comprising a dial light connected between a terminal of said filament source and a terminal of said plate source, a second incandescent lamp comprising a ballast lamp connected between said plate source terminal and ground, and means including a switch for alternatively employing said second lamp as a dial light and said first lamp as a ballast lamp.

NICHOLAS RASKHODOFF.